United States Patent [19]

Darcy et al.

[11] Patent Number: 5,389,734

[45] Date of Patent: Feb. 14, 1995

[54] DEVICE FOR PROTECTING THE END OF AN ELECTRIC CABLE AGAINST THE EFFECTS OF INSULATION BREAKDOWN

[75] Inventors: André Darcy, Calais; Daniel Francois, Andres; Francois Gahungu, Calais, all of France

[73] Assignee: Alcatel N. V., Amsterdam, Netherlands

[21] Appl. No.: 892,803

[22] Filed: May 28, 1992

[30] Foreign Application Priority Data

May 29, 1991 [FR] France ................. 91 06455

[51] Int. Cl.⁶ ........................... H02G 15/22
[52] U.S. Cl. ..................... 174/19; 174/31 R
[58] Field of Search .............. 174/18, 19, 20, 31 R

[56] References Cited

U.S. PATENT DOCUMENTS

| 2,835,725 | 5/1958 | Nicholas | 174/19 |
| 4,403,104 | 9/1983 | Dale | 174/19 |

FOREIGN PATENT DOCUMENTS

| 516518 | 12/1992 | European Pat. Off. | 174/19 |
| 343477 | 2/1960 | France | 174/19 |
| 2590739 | 5/1987 | France . | |
| 524989 | 8/1940 | United Kingdom | 174/19 |

Primary Examiner—Morris H. Nimmo
Attorney, Agent, or Firm—Robbins, Berliner & Carson

[57] ABSTRACT

A device for protecting the end of a high or very high tension electric cable having synthetic insulation from the effects of insulation breakdown, comprises an insulator and a metal enclosure defining a gastight chamber around said end, which chamber contains dielectric gas under pressure and that is separated from ambient air by a rupture disk provided in the metal enclosure. The device further includes a circularly symmetrical collar protecting said insulator and extending inside the chamber around said cable and terminating in a toroidal rim having a convex face directed towards the cable beyond the breakdown zone inside the chamber and at its end distant from the rupture disk. The device is applicable to protecting the end of a very high tension cable.

6 Claims, 2 Drawing Sheets

DEVICE FOR PROTECTING THE END OF AN ELECTRIC CABLE AGAINST THE EFFECTS OF INSULATION BREAKDOWN

The present invention relates to a device for protecting the end of a high or very high tension electric cable against the effects of insulation breakdown.

BACKGROUND OF THE INVENTION

Such a device constitutes, in particular, an outer or inner connection termination under dielectric gas pressure for the high tension cable of an apparatus such as a transformer or an overhead line, for example. It is more particularly applicable to the ends of a cable having synthetic insulation under a tension of tens of thousands of volts, of the order of 100 kV to 400 kV, from which discharge currents in the event of a failure may reach tens of thousands of amps.

In conventional manner, such a device comprises an insulator surrounding the end of the cable and defining a sealed enclosure thereabout under pressure of a dielectric gas. The insulator is closed in gastight manner at a "top" end thereof by a metal cap which passes through the cable conductor to connect it to a terminal fixed on said cap. Its opposite "bottom" end is also closed relative to the cable by means of a metal part.

Such a protection device is described, in particular, in Document FR-A-2 590 739 relating to a high tension cable having synthetic inner insulation and a central conductor which is bared immediately upstream from the closure cap of the insulator for connection to the terminal.

In such protection devices, the enclosure under dielectric gas pressure is designed to retain an operating pressure of about 8 bars to 10 bars and its volume is about 50 liters or more. A short circuit due to a fault in the inner insulation of the cable and/or to excessive surges may cause the metal portions and the insulating portions at the end of the cable to melt, a sudden increase in dielectric gas pressure, discharge currents through the dielectric gas, and an explosion of the insulator, with metal debris, insulator debris, and all of the decomposition products of the adjacent materials being projected over a distance.

Until now, in order to provide protection against possible explosion of the insulator, it has been the practice for the wall of the enclosure to be provided beyond the bottom of the insulator with a rupture disk that enables the dielectric gas to escape to the atmosphere together with the metal debris and all of the decomposition products of the adjacent materials entrained thereby. However, it has not always been possible to prevent metal debris impacting against the inside surface of the insulator, thereby damaging or breaking it. In addition, the arc is not always extinguished by the dielectric gas as quickly as could be desired.

An object of the present invention is to provide a protection device that is more effective to avoid an explosion of the insulator and any impact of metal debris against the inside surface of the insulator, to ensure that any such debris is entrained towards an orifice that is disengaged by the above-mentioned rupture disk, and to reduce the time required by the dielectric gas to extinguish the arc.

SUMMARY OF THE INVENTION

The present invention thus provides a device for protecting the end of a high or very high tension electric cable having synthetic insulation from the effects of insulation breakdown, the device comprising an insulator and a metal enclosure coupled to said insulator and fitted with a rupture disk, said insulator and enclosure being mounted around the end of said cable and defining a gastight chamber around said end, which chamber contains dielectric gas under pressure and is separated from ambient air by said rupture disk;

wherein the device further includes, inside said chamber, a circularly symmetrical collar which is made at least in part of metal, said collar protecting said insulator and extending around said cable and being sufficiently close to the cable for the cross-sectional area of said chamber between the collar and the cable to be much less than the cross-sectional area between the cable and the inside surface of the insulator.

The device of the invention preferably provides at least one of the following additional features:

the collar is mounted on a support coupling said metal enclosure and the insulator together and extending level with the insulator and said cable at least along a breakdown zone inside said chamber;

the collar terminates perceptibly beyond said breakdown zone in the form of a toroidal rim preferably having a convex surface facing the axis of the cable;

the collar is made entirely of metal; and the collar is made of metal covered on its outside surface and on its toroidal rim with a composite material of strong fibers and resin, for example.

BRIEF DESCRIPTION OF THE DRAWINGS

Embodiments of the invention are described by way of example with reference to the accompanying drawings, in which.

DETAILED DESCRIPTION

Figure 1:
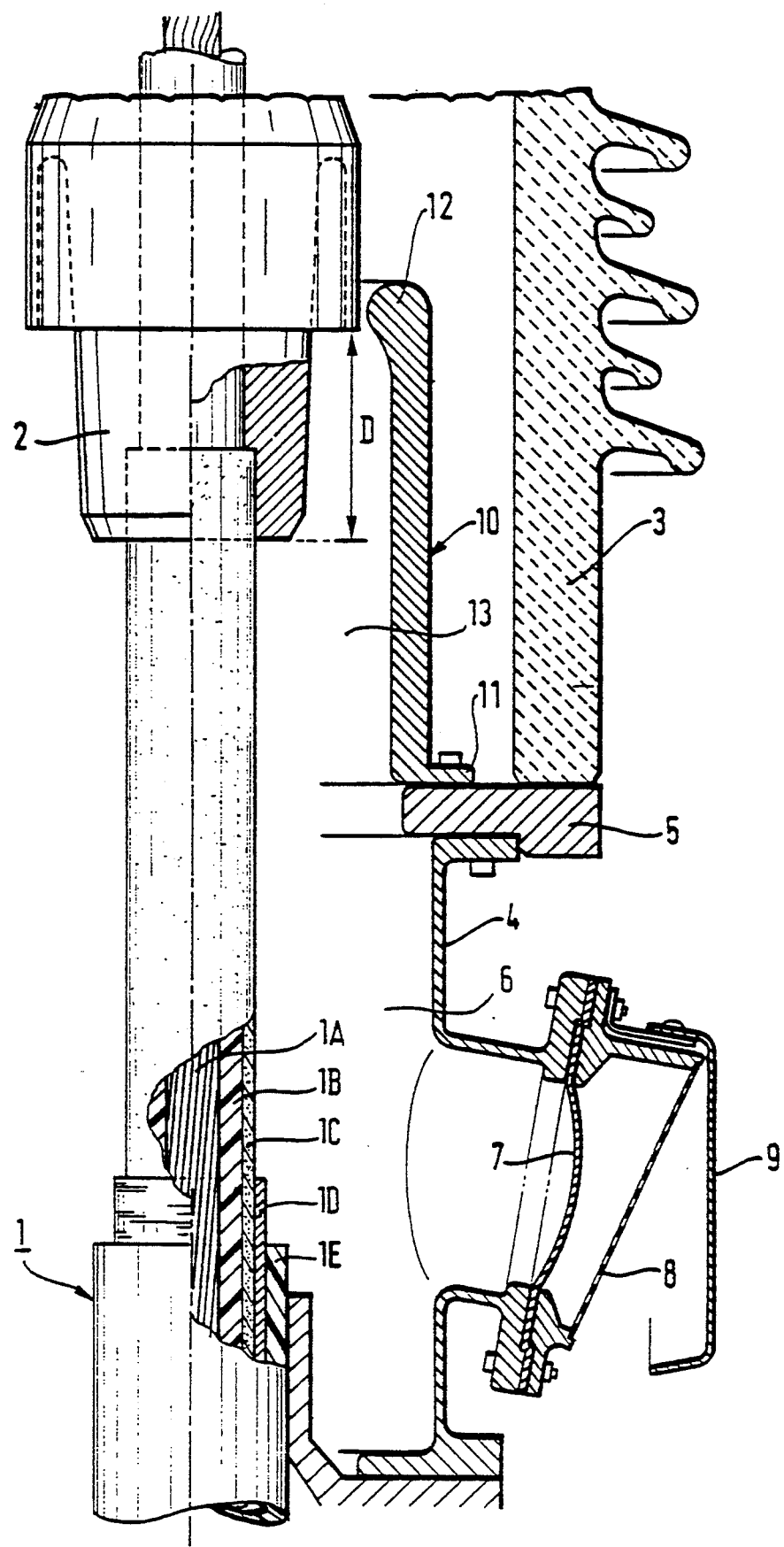
FIG. 1 is a fragmentary diametral half-section through a protection device of the invention mounted on one end of a high tension electric cable having synthetic inner insulation.

In FIG. 1, the electric cable 1 is of the type comprising a central conductor 1A, an inner synthetic insulator 1B on the central conductor, a semiconductive screen 1C on the insulator, a metal screen 1D formed over the semiconductor screen by a sheath of lead or by taping or by copper wires, and an outer protective insulating sheath 1E. The successive layers on the central conductor are bared over different lengths along the end of the cable fitted with the protection device. A deflector 2 is fitted over the end of the bared semiconductive screen 1C and it extends beyond it over the inner insulation.

The device for providing protection against the effects of insulation breakdown comprises an insulator 3 and a metal enclosure 4 which are coupled together and which surround the end of the cable. The insulator is made of porcelain, or of glass, or of a composite material such as glass fibers and epoxy resin. It extends from the end of the cable to slightly beyond the deflector. It is closed at the end of the cable in conventional manner (not shown) by a metal cap which passes through the bared central conductor to connect it to a terminal or the like. Its opposite end, known as the "bottom" of the insulator, is connected to the metal enclosure 4 via a support 5 which is fixed on a flange of the enclosure. The other end of the enclosure is connected to a support 1F which is fixed to the outer sheath 1E of the cable, or in a variant to the screen 1C.

The metal enclosure and the insulator together define a gastight chamber 8 around the end of the cable and filled with a dielectric gas (sulfur hexafluoride, for example).

In the event of a breakdown, a rupture disk 7, e.g. made of nickel, serves to connect the chamber 6 to the atmosphere under the effect of an increase in the pressure of the dielectric gas. Outside the disk, a grating 8 serves, where necessary, to stop metal or other particles coming from the end of the cable in the event of a fault in the inner insulation, which particles could otherwise be projected and entrained by the breakdown and discharge currents through the dielectric gas. A connecting trough 9 provides additional protection in the event of the grating being damaged.

A metal protective collar 10 which is generally cylindrical in shape is fixed by means of a flange 11 to the support 5 that surrounds the end of the cable. It extends at least to beyond the end of the breakdown zone D situated at the end portion of the deflector on the semi-conductive screen.

The collar is terminated by a toroidal rim 12 having a convex surface facing the deflector. The collar 10 defines an annular channel 13 between itself and the deflector, and in particular around the breakdown zone, thereby concentrating the dielectric gas pressure wave that appears during breakdown and directing it towards the metal enclosure for instantaneous destruction of the rupture disk 7 and for connecting the enclosure 6 to the atmosphere. Under such circumstances, the dielectric gas escapes to the atmosphere through the annular channel 13 at great speed, thereby rapidly extinguishing the fault arc and directing molten metal spray particles towards the orifice that has been disengaged by the rupture disk.

The toroidal shape of the rim on the sleeve that projects inwardly but not outwardly avoids disturbing external electric field lines while establishing internal headloss in the pressure wave towards the insulator. The strength of the collar is also sufficient to enable it to withstand the destructive effects of high power discharges accompanied by metal debris.

Figure 2:
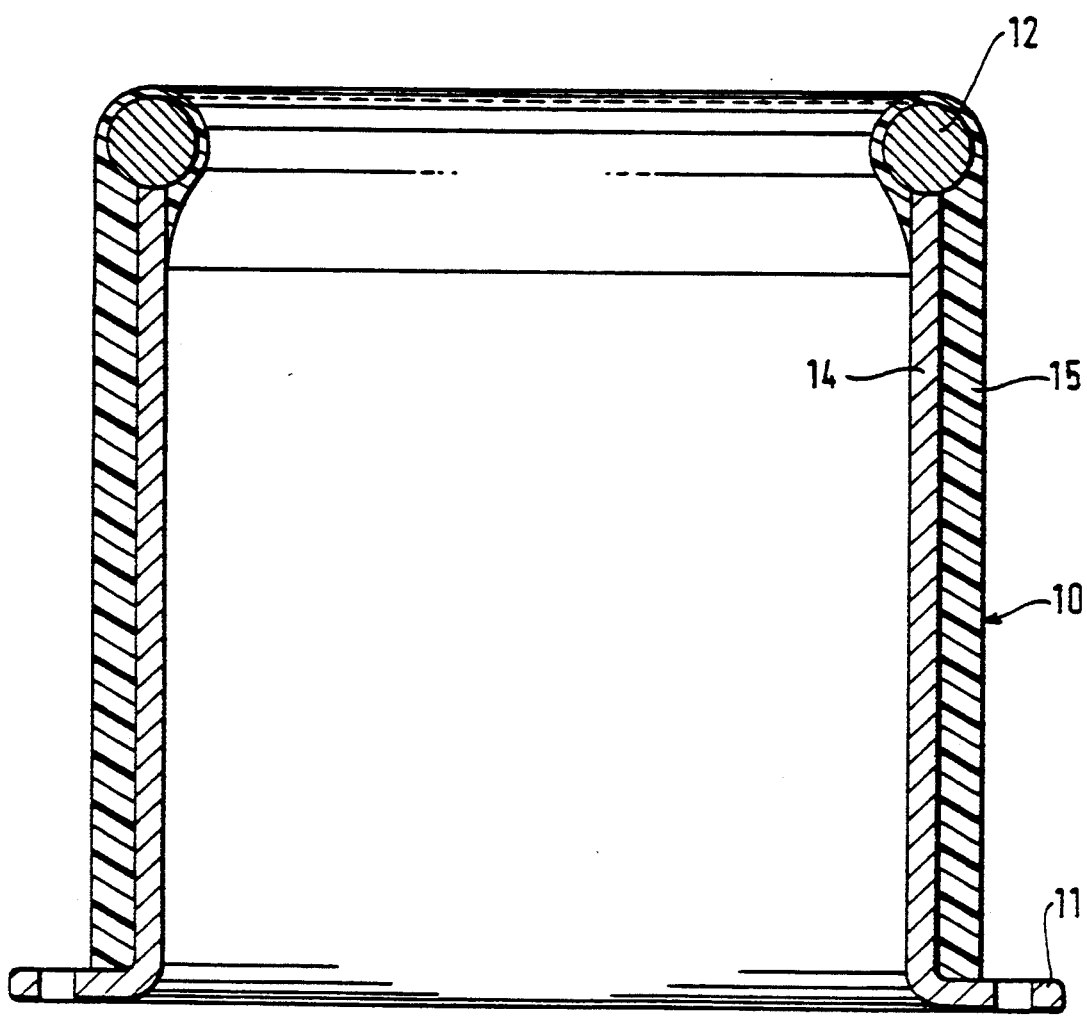
FIG. 2 is a diametral section through another embodiment of a "collar" element of the device of FIG. 1.

FIG. 2 is a diametral section through a composite protection collar designated by the same reference 10 as above. It has a metal body 14 provided in this example with an outer coating 15 of glass fiber and epoxy resin composite material that also coats its toroidal end 12. Like the completely metal collar of FIG. 1, this collar is provided with a flange 11 for fixing to the annular support 5 of FIG. 1.

A composite or an entirely metal collar in accordance with the invention and disposed around the end of a high tension cable level with the bottom portion of its electric field deflector has enabled the insulator to withstand a short circuit current of 31,500 amps at 20,000 volts for a duration of 0.5 seconds.

We claim:

1. A device for protecting the end of a high or very high tension electric cable having synthetic insulation from the effects of insulation breakdown, the device comprising an insulator and a metal enclosure coupled to said insulator and fitted with a rupture disk, said insulator and enclosure being mounted around the end of said cable and defining a gastight chamber around said end, which chamber contains dielectric gas under pressure and is separated from ambient air by said rupture disk;

wherein the device further includes, inside said chamber, a circularly symmetrical collar which is made at least in part of metal, said collar protecting said insulator and extending around said cable and being sufficiently close to the cable for the cross-sectional area of said chamber between the collar and the cable to be much less than the cross-sectional area between the cable and the inside surface of the insulator.

2. A device according to claim 1, wherein said collar is mounted on a support coupling said enclosure and said insulator together and extending level with the insulator and said cable at least along a breakdown zone inside said chamber.

3. A device according to claim 2, wherein the collar terminates perceptibly beyond said breakdown zone in the form of a toroidal rim having a convex surface facing said cable.

4. A device according to claim 1, wherein said collar is made entirely of metal.

5. A device according to claim 1, wherein said collar is made of metal covered on its outside surface with a composite material of strong fibers and resin.

6. A device according to claim 5, wherein said composite material covers said toroidal rim.

* * * * *